United States Patent [19]
Mier

[11] Patent Number: 4,744,512
[45] Date of Patent: May 17, 1988

[54] COMPOSITE SECTION, IN PARTICULAR COMPOSITE CONDUCTOR RAIL

[75] Inventor: Gerhard Mier, Singen, Fed. Rep. of Germany

[73] Assignee: Swiss Aluminium Ltd., Chippis, Switzerland

[21] Appl. No.: 938,823

[22] Filed: Dec. 8, 1986

[30] Foreign Application Priority Data

Dec. 12, 1985 [DE] Fed. Rep. of Germany ....... 3543831

[51] Int. Cl.4 .................................................. B61K 7/02
[52] U.S. Cl. .................................... 238/14.3; 238/148
[58] Field of Search .................. 238/14.05, 14.1, 14.3, 238/14.9, 14.12, 14.13, 14.14, 148, 150

[56] References Cited

U.S. PATENT DOCUMENTS

| | | | |
|---|---|---|---|
| 1,814,476 | 7/1931 | Kurz | 238/148 |
| 3,222,464 | 12/1965 | Dehn | 238/14.3 |
| 3,356,276 | 12/1967 | Robinson et al. | 238/148 |
| 3,716,114 | 2/1973 | Beck | 238/148 |

FOREIGN PATENT DOCUMENTS 742405  5/1943  Fed. Rep. of Germany ...... 238/148

*Primary Examiner*—Joseph F. Peters, Jr.
*Assistant Examiner*—Stephen P. Avila
*Attorney, Agent, or Firm*—Bachman & LaPointe

[57] ABSTRACT

The invention relates to a composite section having a section or part of the rail cross-section made of light metal and also, mounted securely on the same, a section made of a heavy metal which forms a part of the outer surface of the composite section—in particular a composite conductor rail of aluminum or an aluminum alloy and a steel facing or insert joined to it by means of extrusion.

10 Claims, 1 Drawing Sheet

COMPOSITE SECTION, IN PARTICULAR COMPOSITE CONDUCTOR RAIL

BACKGROUND OF THE INVENTION

The invention relates to a composite section having a section or part of the rail cross-section made of light metal and also, mounted securely on the same, a section made of a heavy metal which forms a part of the outer surface of the composite section—in particular a composite conductor rail of aluminum or an aluminum alloy and a steel facing or insert joint to it by means of extrusion.

The power supply for electric trains is made both via steel conductor rails and with composite conductor rails which are either made up of steel and aluminum parts that are screwed together or joined by washer-locked bolts or are extruded out of these materials. In another version aluminum has been cast into the sides of a steel I-beam and subsequently cold rolled. Finally it is also state of the art to make a composite section by clamping a stainless steel sheet onto an aluminum section.

The standard steel/aluminum composite rails for electric train networks suffer several disadvantages. The steel I-beam section with cast-in aluminum is just as undesireable because of its excessive weight as are the conductor rails of steel and aluminum sections that are screwed or bolted together with locking washers; in all cases only a small part of the steel I-beam are used viz., the head which is used for its wear resistance.

In the case of aluminum composite rails with clamped on stainless steel parts the thickness of the stainless steel sheet is, due to the manufacturing method, limited to 2 to 3 mm. Such conductor rails are therefore suitable only for cabin taxis and People-Movers in which there is no great demand for wear resistance. Their use in underground and rapid transit railways is out of the question.

Co-extruded steel/aluminum conductor rails can indeed be manufactured with steel facings twice as thick as the above mentioned rails with clamped on stainless steel sheet, and this without greatly increasing the weight. However, for underground railways which are very demanding with more than 1.5 million collector shoe passes per year, such a steel plate is too thin as a wear resistant facing. This is true in particular for old railway networks with relatively large tolerances where the current collectors mounted on the power unit can wear the conductor rail on one side.

In view of the above the object of the present invention is to devleop a composite section, in particular a high performance composite conductor rail which is able to meet the greatly increased requirements of underground and rapid transit railway services and, along with high electrical conductivity and low weight, offers a sufficiently thick wear resistant facing that the composite section is assured to provide an adequate service life even under the hardest and least favourable operating conditions.

It also lies within the scope of the invention to replace or render superfluous conventional parts of conductor rail networks such as supports and clamps by providing an appropriate shape of conductor rails cross-section.

SUMMARY OF THE INVENTION

The foregoing objects are achieved by way of the invention in that a wear resistant section of a heavy metal is laid on and thermally joined to an outer part of the section made of the heavy metal.

According to further feature of the invention the wear-resistant section or wear-resistant part should be made in particular of steel and rectangular in cross-section. Furthermore, it has been found favourable to have the surface of the wear-resistant section which rests against the steel outer part of the composite section curved, convex in cross-section.

The basic idea therefore lies in welding a steel wear-resistant section to the steel facing of a coextruded conductor rail, in the scope of the invention making use of shielding gas, resistance or laser welding. The current transfer from the wear resistant section to the steel facing of the actual composite conductor rail is significantly improved by hot dip galvanizing or by another galvanizing treatment of the wear resistant part. The thus galvanically pre-heated contact surface is given a slightly curved shape so that the shrinkage of the weld seam during cooling produces better contact pressure between the wear-resistant section of part and the steel facing of the composite conductor rail.

Also within the scope of the invention is a conductor rail shape of such a kind that the said rail can be mounted directly onto insulators on railway sleepers, without requiring a support to hold the conductor rail; the wear resistant part of the conductor rail makes sliding contact with a current collector from above, from below or from the side.

It has been found particularly favourable to taper the base of such a conductor rail towards one side as viewed in cross-section; this makes it possible to adjust the height very simply by insertion of an intermediate plate that is wedge-shaped in cross-section; the intermediate plate is provided with an elongated hole running in the cross-sectional direction, and can as a result still be displaced when the conductor rail is joined to the insulator by a bolt passing through that elongated hole.

A further advantage of the design of the conductor rail according to the invention is that shoulder-like ridges are provided at the side of the sheet, which makes it easier to align abutting conductor rails. These ridges are parts of the wall of a flat recess which accommodates a fish plate that rests against these ridges ensuring almost self alignment of the conductor rails.

In addition to achieving the objective, the invention teaches the provision of a groove at least in the head of the rail; cover plates or sheets for the composite rail can then readily be clipped into these grooves so that other means of attachment are unnecessary.

In all the composite section according to the invention results in a surprisingly large improvement over all other available conductor rails. A service life of more than 50 years can be guaranteed, also under the hardest conditions of impact and shaking under unfavourable operating conditions with up to 1.5 million current collector passes per year. Furthermore, this composite conductor rail is lighter than all other types of conductor rail with the same electrical conductivity and service life.

As a result of the section shape the normal supports can be ommitted and the composite section mounted directly onto the insulators on the railway sleepers. The composite section is, furthermore, not even more expensive as a result of its new shape.

The simple clipping on of protective covering and the automatic alignment of the ends of the conductor rail by the described ridges and connecting fish-plates represent a further advantage.

In addition, lower overall costs for the conductor rail system are achieved as the supports and clamps are not required and the other parts of the system such as protective covering and connecting fish-plates can be mounted in less time because of the special shape of the composite section according to the invention.

A particularly favourable shape of composite conductor rail is obtained if the cross-section of the aluminum part is a sidewards facing U shape, one flange of which is the tapered foot of the rail and the other flange is the head of the rail with the steel facing on the side facing the foot, and the strut of the U features step-shaped ridges on the side facing away from the flanges.

BRIEF DESCRIPTION OF THE DRAWINGS

Further advantages, features and details of the present invention are revealed in the following description of preferred exemplified embodiments and with the aid of the drawings which show in cross section

DETAILED DESCRIPTION

Figure 1:
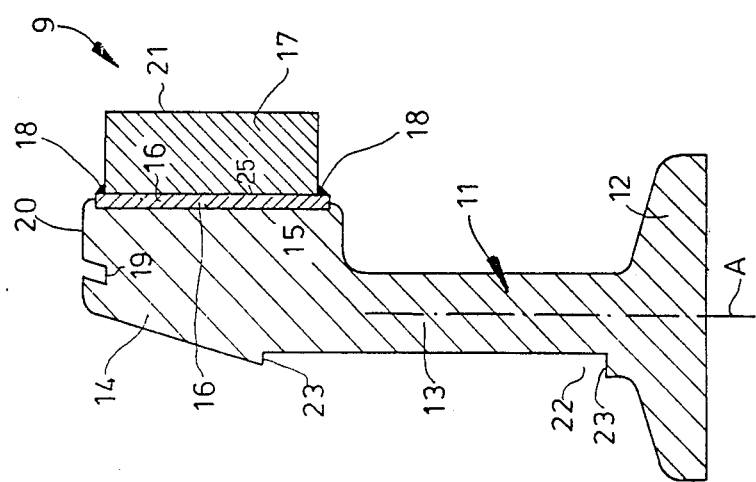
FIG. 1: Is an extruded section of a composite conductor rail

As shown in FIG. 1 a high performance composite conductor rail 9 features a rail base or foot 12, a strut 13 and a head 14 with composite interface 15; the last mentioned runs parallel to the axis A of the strut 13 and bears a steel plate 16 which has been bonded to the light metal main section 11 in a single production step by way of extrusion.

A wear-resistant section 17 of steel is welded at 18 to the steel plate 16. A groove 19 is provided in the face 20 of the composite conductor rail 9 and is for clipping on a protective cover plate that, for reasons of clarity is not shown here.

Figure 2:
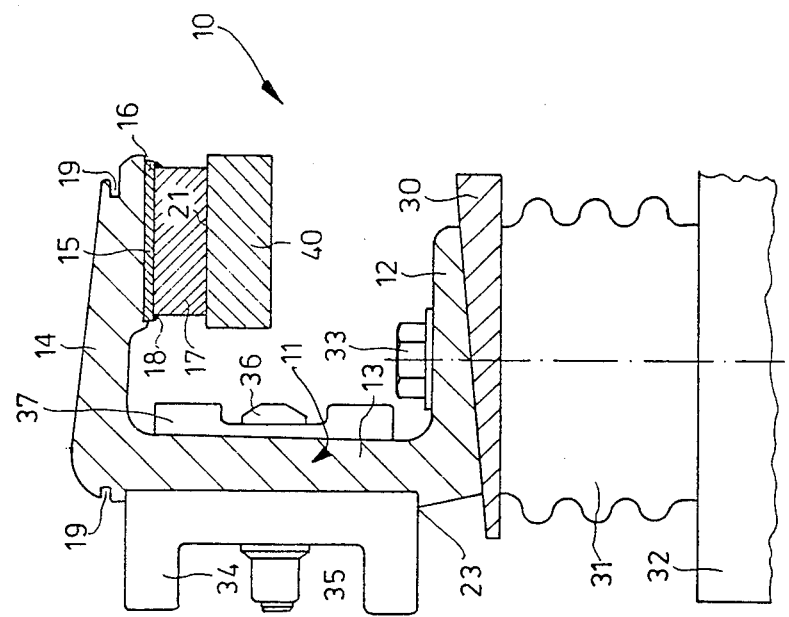
FIG. 2: Is another composite conductor rail on an insulator.

The main section of the composite conductor rail 10 in FIG. 2 is U-shaped in cross-section. The base 12 which, as viewed in cross-section, tapers conically towards its free end, runs parallel to the steel plate 16, and is secured to an insulator 31 with wedge shaped plate 30 between them in conjunction with an elongated hole that cannot be seen there and lies in the plane of the drawing; the insulator 31 is in turn mounted on a sleeper 32. A securing bolt with washer is indicated by 33.

The strut 13 features on its outer face a flat recess 22 with step shaped ridges 23 that delimit its width and serve to align the conductor rail ends to each other.

Inserted in the flat recess 22 is a connecting fish-plate 34 the whole being penetrated by a locking ring bolt 35 the head 36 of which rests against a counter plate 37. Indicated on the surface 21 of the wear resistant section 17, that faces downwards in FIG. 2, is a current collector 40.

For reasons of clarity no indication is given in the drawing that the covered surface 25 of the wear resistant section 17 is slightly convex so that as a result of the shrinkage of the weld seams 18 a better contact pressure is achieved between the wear resistant section 17 and the steel plate, thus ensuring good current transfer between the wear resistant section 17 and the steel plate 16. This latter property is improved by having the wear resistant section 17 first hot dip galvanized or pretreated by another form of plating.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A composite conductor rail comprising a first part made of a light metal, said first part having a composite interface comprising a second substantially planar part made of a heavy metal having a first surface metallically bonded to a portion of said first part by extrusion and a second surface, and a wear resistant section bonded to said second surface of said second part by thermal means.

2. A composite conductor rail according to claim 1 wherein the wear resistant section is rectangular in cross-section and is made of steel.

3. A composite conductor rail according to claim 1 wherein the wear resistant section has a surface which rests against the second surface of the second part and which is curved such that it is convex in cross-section.

4. A composite conductor rail according to claim 1 wherein the wear resistant section has been galvanized to provide good current transfer.

5. A composite conductor rail according to claim 1 wherein the rail is provided with a base and a head and the free surface of the wear resistant section is directed towards the base of the rail.

6. A composite conductor rail according to claim 5 wherein a strut runs between the rail base and the rail head and the free surface of the wear resistant section runs approximately parallel to the strut.

7. A composite conductor rail comprising a first part made of a light metal and a second part made of a heavy metal having a first surface metallically bonded to said first part by extrusion therewith and a second surface having a wear resistant section bonded thereto by thermal means, wherein the rail is provided with a base and a head, the free surface of the wear resistant section is directed towards the base of the rail, and the head of the rail features at least one groove to accommodate an edge of a covering.

8. A composite conductor rail comprising a first part made of a light metal and a second part made of a heavy metal having a first surface metallically bonded to said first part by extrusion therewith and a second surface having a wear resistant section bonded thereto by thermal means and wherein the cross-section of the first part forms a sidewards lying U, one flange of which is a tapered base for the rail and the other flange the head of the rail bearing the second part facing on the side facing the base, while a strut is provided with step shaped ridges on the side facing away from the flanges.

9. A composite conductor rail according to claim 8 wherein the base of the rail, secured to an electric insulator, tapers in cross-section linearly to one edge of the cross-section and rests on a wedge shaped plate that runs with its taper in the opposite direction to that of the rail base.

10. A composite conductor rail according to claim 9 wherein the rail base and insulator are connected by a bolt passing through them, and the plate features for the bolt an elongated hole running in the cross-sectional direction.

* * * * *